United States Patent

Juhola et al.

(10) Patent No.: US 6,631,187 B1
(45) Date of Patent: Oct. 7, 2003

(54) METHOD FOR CONTROLLING DIVERSION IN TELECOMMUNICATION

(75) Inventors: Arto Juhola, Helsinki (FI); Markku Laasonen, Vantaa (FI)

(73) Assignee: Elisa Communications Oyj, Helsinki (FI)

( * ) Notice: Subject to any disclaimer, the term of this patent is extended or adjusted under 35 U.S.C. 154(b) by 0 days.

(21) Appl. No.: 09/720,518

(22) PCT Filed: Jun. 23, 1999

(86) PCT No.: PCT/FI99/00557

§ 371 (c)(1),
(2), (4) Date: Feb. 27, 2001

(87) PCT Pub. No.: WO00/02369

PCT Pub. Date: Jan. 13, 2000

(30) Foreign Application Priority Data

Jun. 24, 1998 (FI) .................................................. 981454

(51) Int. Cl.[7] .......................... H04M 3/42; H04M 3/00; H04M 5/00; H04Q 7/20
(52) U.S. Cl. ............................. 379/211.02; 379/207.02; 379/290; 455/461
(58) Field of Search ..................... 379/211.02, 207.02, 379/290; 455/461

(56) References Cited

U.S. PATENT DOCUMENTS

| 4,807,279 | A | | 2/1989 | McClure et al. |
|---|---|---|---|---|
| 5,018,194 | A | * | 5/1991 | Suzuki et al. |
| 6,049,601 | A | * | 4/2000 | Orui |
| 6,128,503 | A | * | 10/2000 | Granberg et al. |

FOREIGN PATENT DOCUMENTS

| EP | 0588510 | 3/1994 |
|---|---|---|
| WO | 0740480 | 10/1996 |
| WO | WO 97/42748 | 11/1997 |
| WO | WO98 09423 | 3/1998 |

* cited by examiner

*Primary Examiner*—Ahmad F. Matar
*Assistant Examiner*—Thjuan P Knowlin
(74) *Attorney, Agent, or Firm*—Birch, Stewart, Kolasch & Birch, LLP

(57) ABSTRACT

The present invention relates to a control method for a call-forward procedure in telecommunications, in which method calls placed on a user's home address are forwarded to a new target address. According to the invention, the final activation step of the target address is required to be accomplished from the registered target address only. Further according to the invention, the control method of telecommunications location resolution completes the update of location data only if the authenticated user verified to be situated in the location that according to the user's desire is to be registered as the new user location in the location resolution service.

22 Claims, 1 Drawing Sheet

METHOD FOR CONTROLLING DIVERSION IN TELECOMMUNICATION

This application is the national phase under 35 U.S.C. §371 of PCT International Application No. PCT/FI99/00557 which has an International filing date of Jun. 23, 1999, which designated the United States of America.

BACKGROUND OF THE INVENTION

1. Field of the Invention

The invention relates to a control method intended for use in telecommunications as a call-forward procedure or a resolution routine of a target location.

2. Description of Background Art

The method is particularly applicable in situations in which a user (generally: a person, an application entity, an IP node or a data link layer node) operating via a connection or location (e.g., a subscriber connection, a CORBA/Java RMI API, an access point of IP network or an access connection of ATM, FR or the like data link layer) is forwarded in the network topology to another connection or location, whereby the update of the connection forwarding or location resolution should take place with maximum reliability.

In the conventional technique, the called party (a person, software object or process, (sub)network or a node thereof, etc.) cannot place conditions to the calls originating from services that are of the call-forward or location resolution type. Expressed in practical terms, there is no possibility of blocking the forwarding of a call placed from a given number to the home number of a subscriber.

Today, a user configuring a call-forward or location resolution service possesses a full freedom of switching or registering calls or messages placed on his phone number to any other connection or location, whereby the target of the forwarding service may also be accidentally or willfully false. For instance, the user configuring the call-forward service may remember incorrectly the number or location to which the calls or connections should be directed, thus causing said connection or location to be loaded with unnecessary and disturbing calls.

One problem herein is that the traffic is unconditionally directed to the target connection or location irrespective of whether the user (a person, software application, (sub) network or a node thereof) requesting the call-forward service or new location registration has yet actually acquired the new target connection or location.

Currently, the target of the call-forward operation is not expected to explicitly acknowledge the target address forwarding operation in conventional call-forward services prior to the activation of said service.

SUMMARY AND OBJECTS OF THE INVENTION

It is an object of the invention to overcome the drawbacks of the above-described technique and to provide an entirely novel method for controlling a call-forward procedure or a resolution routine of a target location.

The goal of the invention is achieved by virtue of verifying the new location of the user in the network topology prior to activating the registration of a call-forward request or location resolution for the new target location designated by the user. This is accomplished by allowing the final step of activation to be made from the new location (of the new call-forward or location registration procedure) alone and, moreover, by the user only. For instance, in the "Call forward" service of an IN (intelligent network), the forwarding procedure may be initially registered from the source connection, but the final activation step is possible only when performed from the target connection. Then, the user registering the forwarding procedure cannot activate the service so as to be directed to an incorrect location, whereby the possibility of a willful or inadvertent interference is reduced in an essential manner.

The invention offers significant benefits.

The addition disclosed herein to a call-forward or location resolution service gives the target subscriber or user (such as a network connection, application object, application process, network or a node thereof) a possibility of selectively restricting the input of calls or messages directed to his connection or address by the call-forward procedures or location resolution routines.

In addition to being a "stand-alone" service, the call-forward or location resolution procedure may be a component of a more comprehensive service. The invention is widely applicable to, e.g., combination services such as the UPT which essentially comprises two service components: call-forward and alternative charging.

By virtue of the invention, the subscriber of a call-forward/UPT/location resolution service can be assured that not a single forwarded call or message will be accidentally directed elsewhere than only to such addresses (connections, software objects/processes or network nodes) that have explicitly verified their new location in the network topology by an active call to the call-forward service or location resolution system. Accordingly, only after the call-forward service or location resolution system has acknowledged the new location of the service user, the registration of the new target address or location resolution will be activated.

In prior-art procedures such as the telephonic call-forward service, the only possibility of checking the correct configuration of a service has been to place a verification call from a third connection to the connection served by the call-forward service, and even herein, the user is held responsible for submitting the correct address to which the forwarding shall be made.

By virtue of the present call-forward service arrangement, the subscriber has no confidentiality risk of outsider access to forwarded calls/information due to an incorrect configuration of a call-forward or location resolution service.

If so desired, the owner of the target connection, sub (network) node or platform can restrict the switching of call-forward/UPT/location resolution service calls to his connections or locations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is essentially similar to those used in the description of computer networks, the terminology conventionally used in data communications is slightly different, whereby for instance the term "forwarding" may appear in the form "location registration".

DETAILED DESCRIPTION OF THE PREFERRED EMBODIMENTS

Figure 1:
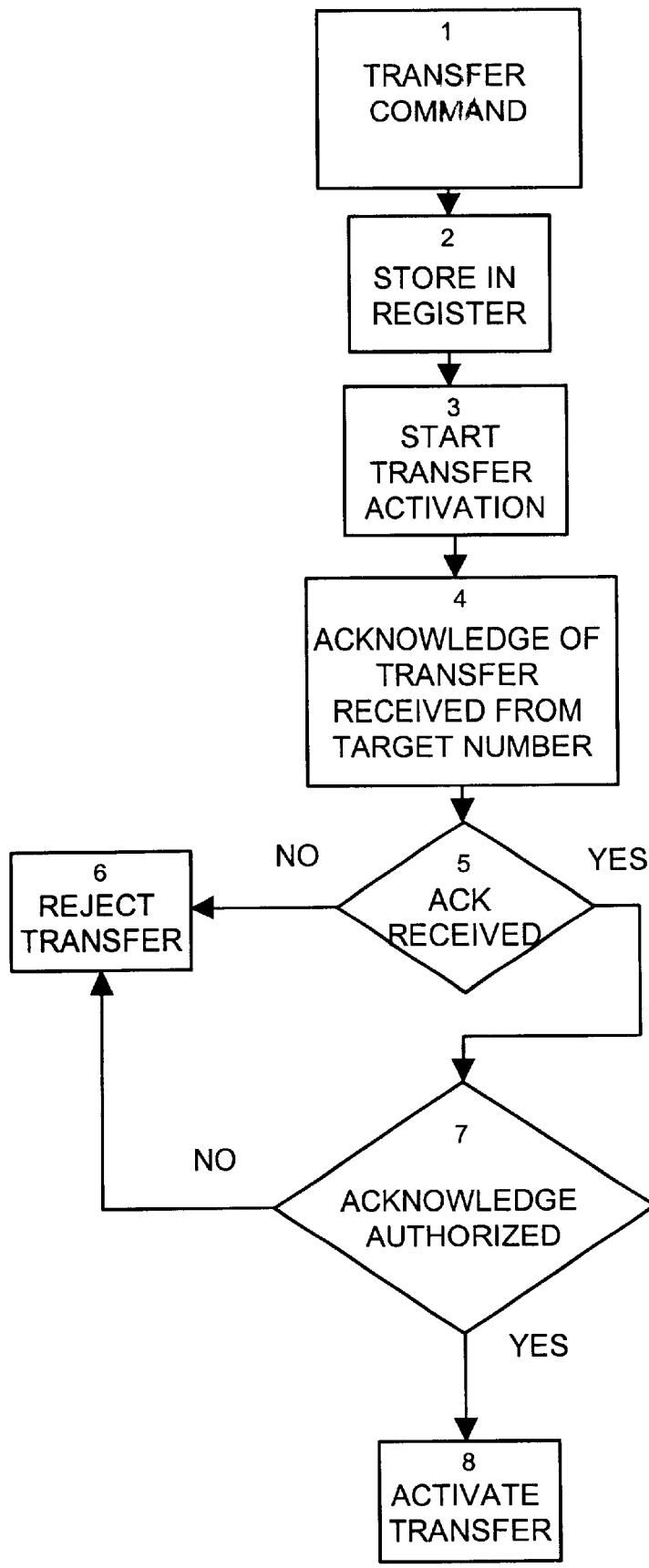
FIG. 1 shows a flow diagram of one embodiment of the method according to the invention, particularly suited for use in conjunction with the IN techniques. While the flow diagram

The text of the application is written using the following terminology covering the use of the invention in telephony as well as other branches of data and telecommunications:

"User"

A person, software object, process, network, subnetwork or a node thereof, any of which being allocated to use the services of the provider network.

"Receiving Party"

A user (cf. definition of user above) receiving a message or a request for setting up a connection.

"Home Address"

An address such as a telephone number, server address, e-mail address, etc., acting as the "unforwarded" address of the user (cf. definition of user above), to which messages or calls are directed unless any forwarding procedure is defined.

"Target Address"

An address such as a telephone number, server address, e-mail address, etc., to which the forwarding service, when activated, directs messages or calls in lieu of the "home address".

"Forwarding"

Switching of data, messages or calls to a target address (instead of "home address"). This definition covers both the call-forward services of telephone communications and the address resolution routines of data communications.

"Location Resolution"

The term location resolution is used in conjunction with the binding of target names to given locations. For instance, in Internet-based service configurations (such as MMUSIC SIP), the call is not directed as a "forwarded call" from the calling connection, but rather the location of the target address is sought on the basis of names (such as the e-mail address URN) from specific location resolution servers.

As shown in FIG. 1 for an IN application, the user that in the illustrated case is a telephone connection subscriber, issues in block 1 a forward command which in block 2 is stored in the register memory of a telecommunications network. The forward command is generally entered from the subscriber's home address, whereby the authentication of the service authorization can also be based on the identification of the party originally requesting the service. The call-forward service is activated from the connection associated with the target address as follows: according to block 3, an active call is placed from the new address (connection) to a given service number and, for instance, with the verbal menu help of a voice response system, the calling party can authenticate the call-forward procedure in block 4. Alternatively, the telecommunication network may actively establish at desired intervals a connection to the target address (connection), thus in block 4 actively requesting for acknowledgment from the target address (or connection). If in block 5 no acknowledge message is received, the forward command is rejected in block 6. If in block 5 an acknowledgment message is returned, but the party acknowledging the operation fails to submit a correct password, the call activation is cancelled. The final check based on a password is an alternative routine possible within the scope of the invention. Normally, the use of a password is not necessary, e.g., in connections allocated for public use. The acknowledge routine of block 4 may also be complemented with options concerning the duration of the call-forward service, whereby the call-forward service can be limited to a preset duration, e.g., typically 12 hours.

Thus, the user can forward his calls when waiting for a high-priority call at the new target number.

In a telephone network, the call-forward operation is accomplished by first calling the IN service registration (using special numbers or characters) that receives the service parameters (target address or connection to which the calls are desired to be directed, duration of service, etc.).

The IN logic reproduces the recorded service parameter values for approval back to the subscriber requesting the service and remains waiting for acknowledgment of the recorded service parameters. If the calling party returns an acknowledgment of the parameter values, the service request is registered.

In an embodiment of the invention, the subscriber of the service is informed in conjunction with the service registration call that the activation of the service requires an acknowledge message to be sent from the desired target address (connection).

As a less limiting or conditional restriction, the service logic may request the subscriber to submit a password assigned to the desired target number before the forwarding procedure will be activated. For this purpose, the subscriber must first get the required password from the owner of the target connection.

It is also possible that the receiving party wishes to acknowledge the registered forwarding procedures prior to their activation. Then, the service logic can call (e.g., via a voice messaging service) the receiving party that acknowledges or rejects the forwarding operations. Optionally, the receiving party may also define preset rules according to which the proposed call-forward transactions are to be accepted or rejected.

According to an embodiment of the invention, the registration of a forwarding service may also be performed directly from a remote connection (e.g., from the connection of the new target address) provided that a strong subscriber authentication method is applied. This alternative may be required, e.g., when a person after coming home belatedly remembers that an important call is due to be received at his job telephone number. If the person authorizing the call-forward operation in such a case is identified in a reliable manner, there is no risk of fraud. Hereby, the separate activation step may be omitted, because the person responsible for authorizing the call-forward operation can be identified correctly (by authentication) and is thus without delay accessible at the target address or target connection of the call-forward operation.

One possible authentication method is to use a PIN code that is known by nobody else but the user only for the acknowledge authorization of the forwarding service as shown in block 7 of FIG. 1.

Thus, unauthorized parties are effectively prevented from performing activation of a registered call-forward procedure to a false target address.

The acknowledge of a forwarding procedure can be accomplished by calling from the target address (connection) to the IN service registration that activates the registered call-forward services only if: 1) the activation request is received from the submitted target address (connection) or, alternatively, 2) the subscriber of the service can be authenticated (option).

If a single target address (connection) shall receive forwarded calls that are redirected from a plurality of home addresses, each forwarding operation can be referenced by its specific home number from which the calls are to be forwarded thus making the registration or activation step of the transaction faster.

Prior to the activation of services, the target address (connection) is typically requested to submit a consent to accept the forwarded calls, to enter possible unlisted telephone numbers or addresses and to set the maximum duration of the service. The target address is also given an option to cancel registrations of undesired call-forward services and to prevent the registration of new call-forward services (concerning all or a limited number of (virtual) connections or groups formed by such numbers).

Respectively, an option is given to authorize the registration or activation of forwarding for certain types of calls only.

At will, the receiving party can cancel some or all of the already activated callforward services.

If so required, the ring tones sent to the target address (connection) can be specified to be different for the different call-forward services.

In conjunction with forwarding services performed over data connections, the request for a forwarding service or location resolution must be completed as a single transaction inasmuch herein the use of some strong authentication method is absolutely mandatory.

The function of a data forward service based on the call-forwarding principle is similar to that of the analog telephone call forward procedure described above.

In a location resolution case, the novel modified location resolution service verifies that the location resolution request is specifically directed to the same connection, interface, platform, network or a node thereof, in which the user registering the new location is presently located.

The verification step can be performed, e.g., by sending some reply request (that cannot be satisfied by a reply of a predictable type) to the receiving party using the registered target location in the address of the message (assuming that the network routing procedure is not susceptible to fraudulent aliasing).

Also other types of receiving party verification can be used.

If the user wishes to register a target location different from the user's present physical location, the forwarding service request is rejected (and in the case of repeated registration attempts, standard precautionary procedures may be activated including suspended answering, etc.)

A minor limitation of the present invention is that the above-described benefits cannot be extended to cover call requests or messages directed via the conventional call-forward or location resolution services. Hence, calls or messages directed via unmodified call-forward or location resolution services may still inadvertently reach incorrect connections or addresses.

What is claimed is:

1. A control method for a call-forward service in an intelligent telecommunications network comprising the following steps:
   registering instructions for a call-forward operation for forwarding a call from a first predetermined call address to a target call address, the target call address thus becoming a registered target call address;
   requiring verification from the registered target call address as a final activation step of the target call address is required to be accomplished from the registered target call address.

2. The method according to claim 1, wherein an update of a registered call-forward operation is allowed for the user of said call-forward service.

3. The method according to claim 1, wherein the final activation of a newly registered call-forward operation is performed solely from the registered target call address.

4. The method according to claim 1, wherein information required by the call-forward service is registered from a user's home address, and the final activation step of the call-forward operation is performed from the registered target call address.

5. The method according to claim 1, wherein both the registration step and the final activation step of the call-forward operation are performed from the registered target call address.

6. The method according to claim 1, wherein an active message is issued to a control system of the intelligent network about the activation of the call-forward operation.

7. The method according to claim 1, wherein a voice response device of a public telephone network is used to establish connections at preset intervals to the registered target call address.

8. The method according to claim 1, wherein an update of the registered call-forward service is performed by means of a separate connection established from the registered target call address.

9. The method according to claim 1, wherein the activation step of an update of the registered call-forward service is performed by means of a separate connection established from the registered target call address to a present service address.

10. The method according to claim 1, wherein in conjunction with the activation step of an update of the registered call-forward operation the user is authenticated and the user's connection is verified.

11. The method according to claim 1, wherein an announcement service is used to establish connections at preset intervals, the announcement being issued at the activation of the connection.

12. A control method for a location resolution service in telecommunications comprising the following steps:
   registering instructions for a location resolution operation for forwarding a call from a first predetermined call address to a location resolution data address, the location resolution data address being a verified new location;
   requiring verification from the verified new location as a final activation step of the location resolution data is required to be accomplished from the verified new location.

13. The method according to claim 12, wherein an update of the location resolution operation is allowed for the location resolution service.

14. The method according to claim 12, wherein the final activation of a newly registered location resolution operation is performed solely from the verified new location.

15. The method according to claim 12, wherein both the registration step and the final activation step of the location resolution operation are performed from the verified new location.

16. The method according to claim 12, wherein an active message is issued to a control system of the location resolution service about the activation of a location resolution routine.

17. The method according to claim 12, wherein an announcement service is used to establish connections at preset intervals, the announcement being issued at the activation of the connection.

18. The method according to claim 12, wherein an update of the location resolution service is performed by means of a separate connection established from the verified new location.

19. The method according to claim 12, wherein the activation step of an update of the location resolution service is performed by means of a separate connection established from the verified new location to a present location resolution interface.

20. The method according to claim 12, wherein in conjunction with the activation step of an update of the location resolution service, the user is authenticated and the user's location is verified.

21. The method according to claim 1, wherein said final activation step includes an acknowledgement message being sent from the registered target call address in order to permit said call-forward operation.

22. The method according to claim 12, wherein said final activation step includes an acknowledgement message being sent from the verified new location in order to permit said location resolution operation.

* * * * *